US010600188B2

(12) United States Patent
Choi et al.

(10) Patent No.: US 10,600,188 B2
(45) Date of Patent: Mar. 24, 2020

(54) METHOD AND SYSTEM FOR CORRECTING FIELD OF VIEW USING USER TERMINAL INFORMATION UPON PLAYBACK OF 360-DEGREE IMAGE

(71) Applicant: KOREA ADVANCED INSTITUTE OF SCIENCE AND TECHNOLOGY, Daejeon (KR)

(72) Inventors: Junkyun Choi, Daejeon (KR); Jinhong Yang, Daejeon (KR); Kyu Yeong Jeon, Daejeon (KR); Hyo Jin Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 137 days.

(21) Appl. No.: 15/595,568

(22) Filed: May 15, 2017

(65) Prior Publication Data
US 2017/0330332 A1   Nov. 16, 2017

(30) Foreign Application Priority Data

May 16, 2016   (KR) .................. 10-2016-0059320
Jul. 11, 2016   (KR) .................. 10-2016-0087641

(51) Int. Cl.
*G06T 7/215*   (2017.01)
*G06F 3/06*   (2006.01)
(Continued)

(52) U.S. Cl.
CPC ............ *G06T 7/215* (2017.01); *G06F 3/0602* (2013.01); *G06T 11/005* (2013.01);
(Continued)

(58) Field of Classification Search
CPC ............ G02B 13/06; G02B 2027/0187; G02B 27/0093; G06F 17/2241; G06F 3/0602; G06T 11/005; G06T 7/215; H04N 13/366; H04N 5/2224; H04N 5/23238
See application file for complete search history.

(56) References Cited

U.S. PATENT DOCUMENTS

2004/0169724 A1*  9/2004  Ekpar .................. G06T 3/0062
                                                           348/36
2011/0298829 A1* 12/2011  Stafford ............. G06K 9/00248
                                                           345/659
(Continued)

FOREIGN PATENT DOCUMENTS

KR       20020078141       10/2002
KR       100663483 B1      12/2006
(Continued)

OTHER PUBLICATIONS

Office Action for Korean Application No. 10-2016-0087641; dated Jul. 17, 2017.

*Primary Examiner* — Afroza Chowdhury
(74) *Attorney, Agent, or Firm* — Ferguson Case Orr Paterson

(57) ABSTRACT

A method and a system for correcting a field of view (FOV) using tilt information of a user terminal upon playback of a 360-degree image. The method includes requesting to load a 360-degree image, correcting at least one of a tilt of the mobile terminal and a sensing value associated with a gesture input of the mobile terminal, for determining an FOV of the 360-degree image, with respect to the 360-degree image, and playing back the 360-degree image by exposing an FOV depending on at least the corrected tilt or the corrected sensing value.

16 Claims, 10 Drawing Sheets

(51) Int. Cl.
G06T 11/00 (2006.01)
G06F 17/22 (2006.01)
H04N 13/366 (2018.01)
H04N 5/232 (2006.01)
*G02B 13/06* (2006.01)
*H04N 5/222* (2006.01)
*G02B 27/00* (2006.01)
*G02B 27/01* (2006.01)

(52) U.S. Cl.
CPC ......... *H04N 5/23238* (2013.01); *G02B 13/06* (2013.01); *G02B 27/0093* (2013.01); *G02B 2027/0187* (2013.01); *G06F 17/2241* (2013.01); *H04N 5/2224* (2013.01); *H04N 13/366* (2018.05)

(56) References Cited

U.S. PATENT DOCUMENTS

| | | | | |
|---|---|---|---|---|
| 2012/0136573 | A1* | 5/2012 | Janardhanan | G01C 21/165 |
| | | | | 701/512 |
| 2012/0169464 | A1* | 7/2012 | Aoki | G06K 9/00926 |
| | | | | 340/5.82 |
| 2012/0212405 | A1* | 8/2012 | Newhouse | G02B 27/017 |
| | | | | 345/156 |

FOREIGN PATENT DOCUMENTS

| | | |
|---|---|---|
| KR | 20150029461 | 3/2015 |
| KR | 20150031662 | 3/2015 |
| KR | 101528863 | 6/2015 |
| KR | 101530826 B1 | 6/2015 |
| KR | 20160011016 | 1/2016 |

\* cited by examiner

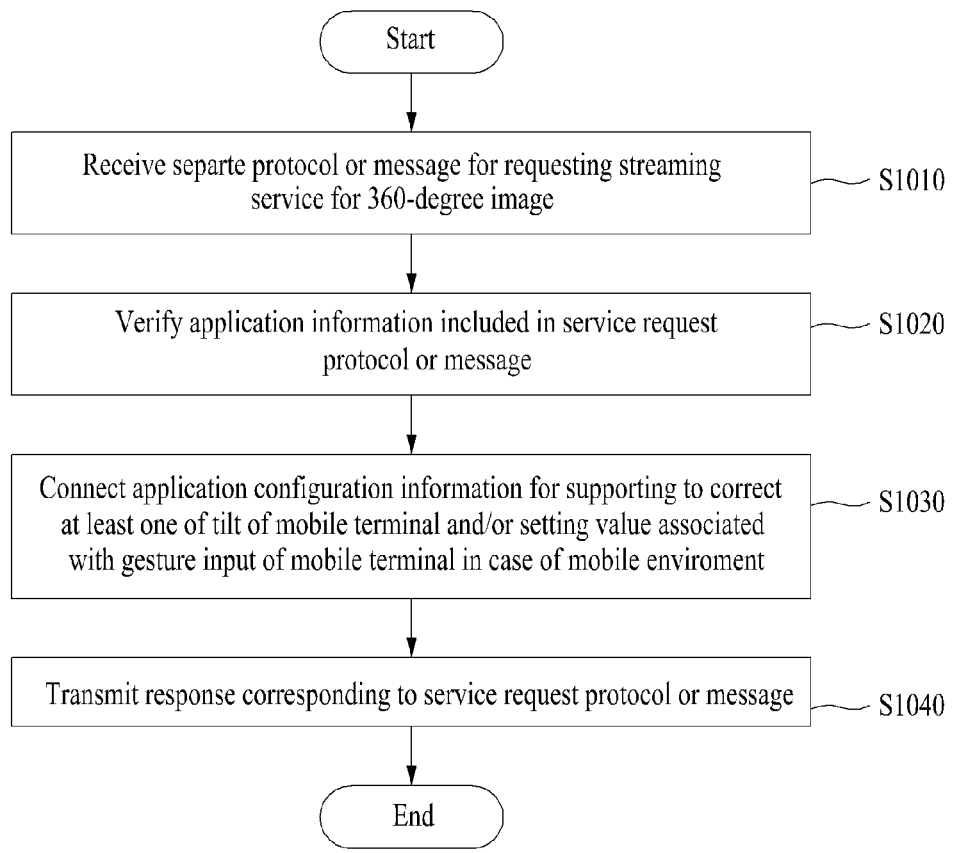

METHOD AND SYSTEM FOR CORRECTING FIELD OF VIEW USING USER TERMINAL INFORMATION UPON PLAYBACK OF 360-DEGREE IMAGE

CROSS-REFERENCE TO RELATED APPLICATIONS

A claim for priority under 35 U.S.C. § 119 is made to Korean Patent Application No. 10-2016-0059320 filed May 16, 2016, and No. 10-2016-0087641 filed Jul. 11, 2016, in the Korean Intellectual Property Office, the entire contents of each of which is hereby incorporated by reference.

BACKGROUND

Embodiments of the inventive concept described herein relate to technologies for correcting a field of view (FOY) of a 360-degree image.

As interest in virtual reality (VR) is enhanced, interest in VR content may be also increased. For example, Korean Patent Laid-open Publication No. 10-2002-0078141 (published on Oct. 18, 2002) discloses a system and method for producing a VR video image to obtain an object video using a plurality of video cameras and displaying the object video on a viewer in real time over a network and a local path.

VR content may be produced or captured as a panorama image of a 360-degree omnidirectional view point. A user may perform stereoscopic viewing of the VR content, which is not provided from a conventional video, and may select a direction he or she wants in all 360-degree directions and may view the VR content, rather than a form of viewing dependent on a specific view point of a photographer.

The content itself may be provided as an image of a 360-degree omnidirectional view point, but only a limited area may be consumed according to characteristics of a medium which consumes content, for example, a VR player, a mobile terminal, a web, or the like.

Particularly, if the user consumes a 360-degree image in a mobile environment rather than a dedicated terminal, he or she may miss an important scene or a specific scene depending on an FOV of content.

SUMMARY

Embodiments of the inventive concept provide a method and system for correcting an FOV of content using tilt information and/or gesture information of a mobile terminal upon playback of a 360-degree image.

According to an aspect of an embodiment, a field of view (FOY) correction method performed in a mobile terminal implemented with a computer may include requesting to load a 360-degree image, correcting at least one of a tilt of the mobile terminal and a sensing value associated with a gesture input of the mobile terminal, for determining an FOV of the 360-degree image, with respect to the 360-degree image, and playing back the 360-degree image by exposing an FOV depending on at least the corrected tilt or the corrected sensing value.

The correcting of the at least one may include averaging tilt values collected by the mobile terminal and correcting the tilt of the mobile terminal relative to the averaged tilt value.

The method may further include, if the 360-degree image is included on a timeline of an application loaded into the mobile terminal or on a webpage, recording a tilt value detected by the mobile terminal. The correcting of the at least one may include averaging the recorded tilt values and correcting the tilt of the mobile terminal relative to the averaged tilt value.

The correcting of the at least one may include averaging tilt values recorded in a cache on an application loaded into the mobile terminal or in a cookie or cache on a browser and correcting the tilt of the mobile terminal relative to the averaged tilt value.

The correcting of the at least one may include correcting the tilt of the mobile terminal relative to an average tilt value of the mobile terminal, the average tilt value being stored on a server which provides the 360-degree image.

The correcting of the at least one may include averaging sensing values depending on a gesture input which occurs on the mobile terminal and correcting sensing sensitivity of the gesture input relative to the averaged sensing value.

The method may further include, if the 360-degree image is included on a timeline of an application loaded into the mobile terminal or on a webpage, recording a sensing value depending on a gesture input which occurs on the mobile terminal. The correcting of the at least one may include averaging the recorded sensing values and correcting sensing sensitivity of the gesture input relative to the averaged sensing value.

The playing back of the 360-degree image may include executing automatic playback by moving a current FOV to a basic FOV and exposing the current FOV if an automatic playback function is executed for the played-back 360-degree image.

The executing of the automatic playback may include moving the current FOV of the 360-degree image to the basic FOV corresponding to initial viewing angle information set in the 360-degree image.

The executing of the automatic playback may include extracting a basic FOV based on pixel information or meta information of the 360-degree image and moving the current FOV of the 360-degree image to the extracted basic FOV.

According to another aspect of an embodiment, an FOV correction method performed in a server implemented with a computer may include receiving a protocol or a message for requesting a streaming service for a 360-degree image from a user terminal, analyzing application information included in the protocol or the message for requesting the streaming service and determining a content consumption environment of the user terminal, if the content consumption environment is a mobile environment, connecting configuration information, to support the correction of at least one of a tilt of a mobile terminal and a sensing value associated with a gesture input of the mobile terminal, to the 360-degree image, and transmitting the 360-degree image connected to the configuration information to the mobile terminal, the 360-degree image being as a response to the protocol or the message for requesting the streaming service.

The mobile terminal may play back the 360-degree image by correcting at least one of the tilt of the mobile terminal and the sensing value associated with the gesture input, for determining an FOV of the 360-degree image depending on the response and exposing an FOV depending on at least the corrected tilt or the corrected sensing value.

The method may further include setting initial viewing angle information which is a basic FOV with respect to the 360-degree image.

The setting of the initial viewing angle information may include setting the initial viewing angle information using a center area based on pixel information of the 360-degree image.

According to another aspect of an embodiment, a computer program stored in a computer-readable medium may be used to execute an FOV correction method performed in a mobile terminal implemented with a computer, the method including requesting to load a 360-degree image, correcting at least one of a tilt of the mobile terminal and a sensing value associated with a gesture input of the mobile terminal, for determining an FOV of the 360-degree image, with respect to the 360-degree image, and playing back the 360-degree image by exposing an FOV depending on at least the corrected tilt or the corrected sensing value.

According to another aspect of an embodiment, a mobile terminal implemented with a computer may include at least one processor configured to execute a computer-readable instruction. The at least one processor may be configured to request to load a 360-degree image, correct at least one of a tilt of the mobile terminal and a sensing value associated with a gesture input of the mobile terminal, for determining an FOV of the 360-degree image, with respect to the 360-degree image, and play back the 360-degree image by exposing an FOV depending on at least the corrected tilt or the corrected sensing value.

According to another aspect of an embodiment, a server implemented with a computer may include at least one processor configured to execute a computer-readable instruction. The at least one processor may be configured to receive a protocol or a message for requesting a streaming service for a 360-degree image from a user terminal, analyze application information included in the protocol or the message for requesting the streaming service and determine a content consumption environment of the user terminal. If the content consumption environment is a mobile environment, the at least one processor may connect configuration information, for supporting the correction of at least one of a tilt of a mobile terminal and a sensing value associated with a gesture input of the mobile terminal, to the 360-degree image, and transmit the 360-degree image connected to the configuration information to the mobile terminal, the 360-degree image being as a response to the protocol or the message for requesting the streaming service. The mobile terminal may play back the 360-degree image by correcting at least one of the tilt of the mobile terminal and the sensing value associated with the gesture input, for determining an FOV of the 360-degree image, depending on the response and exposing an FOV depending on at least the corrected tilt or the corrected sensing value.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 10 is a flowchart illustrating an example of a method which may be performed by a server according to an embodiment of the present disclosure.

DETAILED DESCRIPTION

Hereinafter, a description will be given in detail of an embodiment of the inventive concept with reference to the accompanying drawings.

Figure 1:
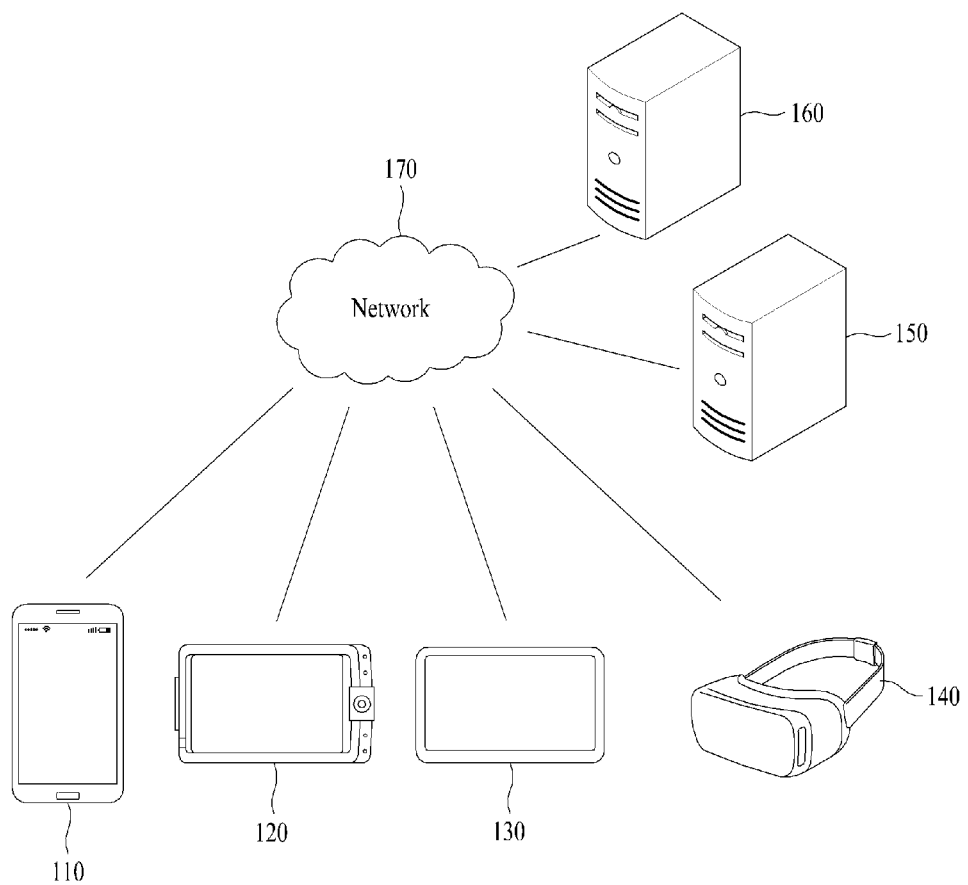
FIG. 1 is a drawing illustrating an example of a network environment according to an embodiment of the present disclosure.

FIG. 1 is a drawing illustrating an example of a network environment according to an embodiment. The network environment of FIG. 1 is an example including a plurality of electronic devices 110, 120, 130, and 140, a plurality of servers 150 and 160, and a network 170. FIG. 1 is only an example for describing the inventive concept, and the number of electronic devices or the number of servers is not limited to FIG. 1.

Each of the plurality of electronic devices 110, 120, 130, and 140 may be a fixed terminal or a mobile terminal, implemented with a computer device. Each of the plurality of electronic devices 110, 120, 130, and 140 may be, for example, a smartphone, a mobile phone, a display device such as a television (TV), a virtual reality (VR) player, a head mounted display (HMD), a navigation device, a computer, a laptop, a digital broadcast terminal, personal digital assistants (PDA), a portable multimedia player (PMP), a tablet personal computer (PC), or the like. For example, the electronic device 110 may communicate with the other electronic devices 120, 130, and 140 and/or the servers 150 and 160 over the network 170 using a wireless or wired communication mode.

The communication mode is not limited thereto. The communication mode may include a communication mode using short-range wireless communication as well as a communication mode using a communication network (e.g., a mobile communication network, a wired internet, a wireless internet, a broadcast network, or the like) which may be included in the network 170. For example, the network 170 may include one or more of networks such as a personal area network (PAN), a local area network (LAN), a campus area network (CAN), a metropolitan area network (MAN), a wide area network (WAN), a broadband network (BBN), a content delivery network (CDN), and the Internet. Further, the network 170 may include, but is not limited to, one or more of network topologies including a bus network, a star network, a ring network, a mesh network, a star-bus network, a tree or hierarchical network, and the like.

Each of the servers 150 and 160 may be implemented with a computer device or a plurality of computer devices which communicate with the plurality of electronic devices 110, 120, 130, and 140 over the network 170 and provide an instruction, a code, a file, content, a service or the like.

For example, the server 160 may provide a file for installing an application to the electronic device 110 accessed over the network 170. In this case, the electronic device 110 may install the application using the file provided from the server 160. Further, the electronic device 110 may access the server 150 based on control of an operating system (OS) or at least one program (e.g., a browser or the installed application) included in the electronic device 110 and may receive a service or content provided from the server 150. For example, if the electronic device 110 transmits a service request message to the server 150 over the network 170 based on control of the application, the server 150 may transmit a code corresponding to the service request message to the electronic device 110. The electronic device 110 may provide content to a user by configuring and displaying a screen depending on a code based on control of the application.

Figure 2:
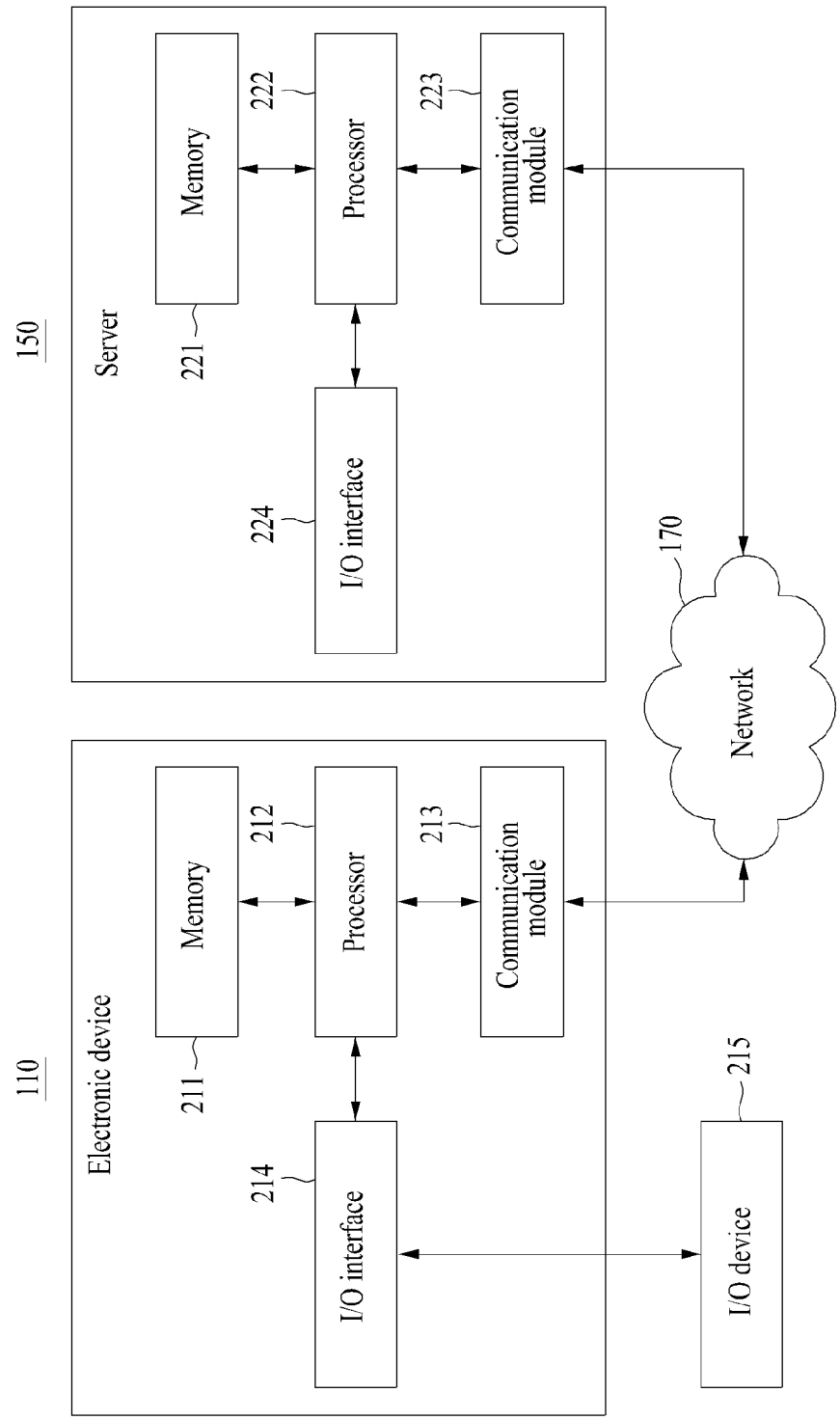
FIG. 2 is a block diagram illustrating an internal configuration of an electronic device and an internal configuration of a server in an embodiment of the present disclosure.

FIG. 2 is a block diagram illustrating an internal configuration of an electronic device and an internal configuration of a server in an embodiment of the present disclosure. FIG. 2 illustrates an internal configuration of an electronic device 110 as an example of one electronic device and an internal configuration of a server 150 as an example of one server. The other electronic devices 120, 130, and 140 or the server 160 may have the same or different internal configuration from the electronic device 110 or the server 150.

The electronic device 110 may include a memory 211, a processor 212, a communication module 213, and an input/output interface 214. The server 150 may include a memory 221, a processor 222, a communication module 223, and an input/output interface 224. Each of the memories 211 and 221 may be a computer-readable storage medium and may include a random access memory (RAM) and a permanent mass storage device such as a read only memory (ROM) or a disc drive. Further, each of the memories 211 and 221 may store an operating system (OS) or at least one program code (e.g., a code for a browser, an application, or the like installed and executed in the electronic device 110). Such software elements may be loaded from a separate computer-readable storage medium independent of the memories 211 and 221. Such a separate computer-readable storage medium may include a computer-readable storage medium such as a floppy drive, a disc, a tape, a digital versatile disc/compact disc-ROM (DVD/CD-ROM), a memory card, or the like. In another embodiment, the software elements may be loaded into the memories 211 and 221 via the communication module 213 and 223 rather than a computer-readable storage medium. For example, at least one program may be loaded into the memories 211 and 221 based on a program (e.g., the above-mentioned application) installed by files provided over the network 170 from developers or a file distribution system which distributes a file for installing an application.

Each of the processors 212 and 222 may be configured to process instructions of a computer program by performing basic calculation and logic and input/output arithmetic operations. The instructions may be provided to the processor 212 and 222 by the memories 211 and 221 and the communication modules 213 and 223. For example, each of the processors 212 and 222 may be configured to execute instructions received according to a program code stored in a storage device such as the memories 211 and 221.

The communication modules 213 and 223 may provide a function such that the electronic device 110 and the server 150 communicate with each other over the network 170 and may provide a function for communicating with another electronic device (e.g., the electronic device 120) and another server (e.g., a server 160). For example, a request generated according to a program code stored in a storage device such as the memory 211 by the processor 212 of the electronic device 110 (e.g., a request for a panorama image service) may be transmitted to the server 150 over the network 170 based on control of the communication module 213. In contrast, a control signal, an instruction, content, a file, or the like provided based on control of the processor 222 of the server 150 may be received at the electronic device 110 via the communication module 213 of the electronic device 110. For example, a control signal, an instruction, or the like of the server 150, received via the communication module 213, may be transmitted to the processor 212 or the memory 211, and content, a file, or the like of the server 150 may be stored in a storage medium which may be further included in the electronic device 110.

The input/output interface 214 may be a means for an interface with an input/output device 215. For example, an input device included in the input/output device 215 may include a device such as a keyboard or a mouse, and an output device included in the input/output device 215 may include a device such as a display for display a communication session of an application. For another example, the input/output interface 214 may be a means for an interface with a device, such as, a touch screen, in which functions for an input and an output are integrated into one function. As a more detailed example, when the processor 212 of the electronic device 110 processes an instruction of a computer program loaded into the memory 211, a service screen or content configured using data provided from the server 150 or the electronic device 120 may be displayed on a display via the input/output interface 214.

Further, in other embodiments, the electronic device 110 and the server 150 may include more elements than the elements of FIG. 2. However, there is no need for clearly illustrating most conventional elements. For example, the electronic device 110 may be implemented to include at least part of the input/output device 215 or may further include other elements such as a transceiver, a global positioning system (GPS), a camera, various sensors, and a database. As a more detailed example, if the electronic device 110 is a smartphone, it may be seen that the electronic device 110 may be implemented to further include a variety of elements such as an accelerometer or a magnetic sensor, a gyro sensor, a camera, various physical buttons, a button using a touch panel, an input/output port, and a vibrator for vibration, generally included in the smartphone.

Embodiments relate to technologies for correcting an FOV of a 360-degree image and may be applied to a service field for providing an image service, a broadcast service, and a service using a 360-degree image such as a virtual experience environment, a device field for supporting the playback of a 360-degree image, or the like.

Embodiments including examples disclosed in detail in the specification may correct a playback focus of a 360-degree image due to a difference in a tilt or a gesture input in a mobile playback environment, thus accomplishing considerable advantages in view of efficiency, convenience, cost saving, or the like.

A 360-degree image may be described as a representative example in the specification. However, embodiments are not limited thereto. For example, the specification may be described for all panorama images, such as spherical content and a three-dimensional (3D) image, a view point (or a view angle) of which may be adjusted, other than the 360-degree image.

Figure 3:
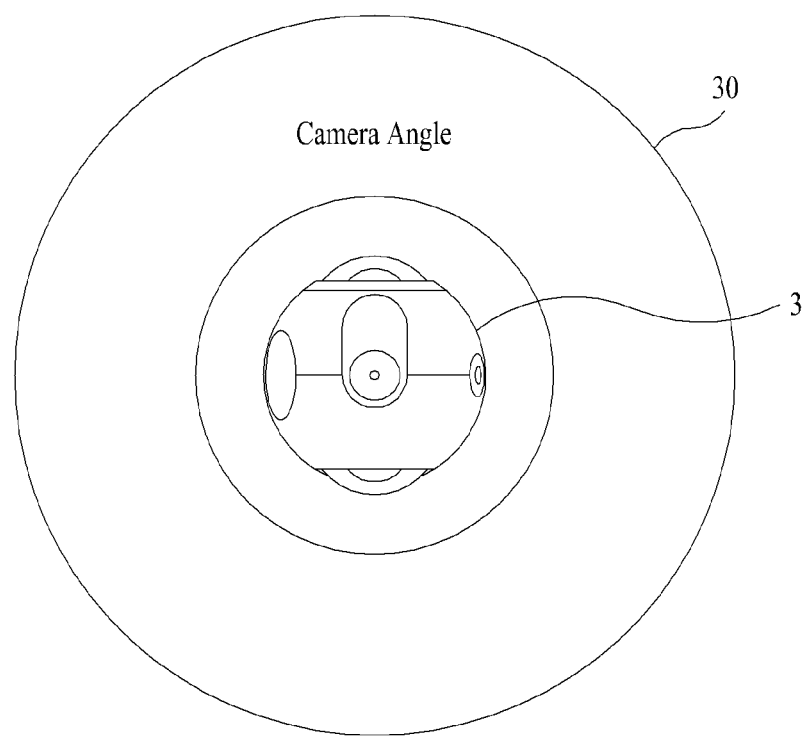
FIGS. 3 and 4 are drawings illustrating a characteristic of a 360-degree image.

For example, the 360-degree image may be produced using a 360-degree camera or the like. For example, as shown in FIG. 3, a 360-degree camera 3 may obtain an image 30 of a 360-degree omnidirectional view point by simultaneously capturing an image using several lenses which may capture the image at a view angle of 360 degrees and stitching the captured photos/images.

Figure 4:
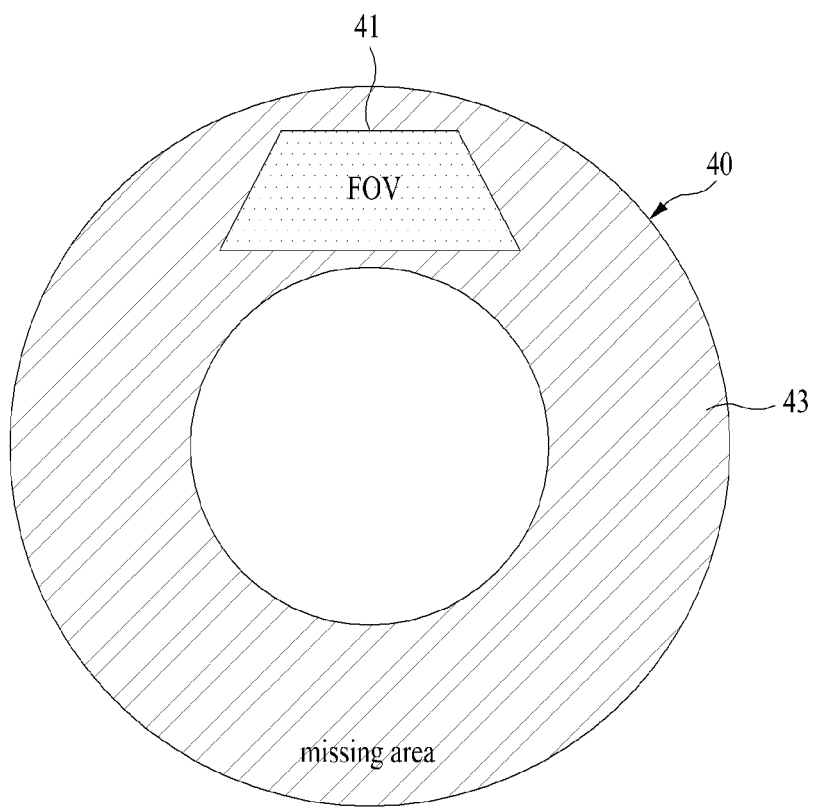

In the case of the 360-degree image, content itself may be provided as an image of 360-degree omnidirectional view point, but only a limited region of the content may be consumed according to a characteristic of a medium which consumes the content, for example, a VR player, a mobile terminal, a web, or the like. Referring to FIG. 4, a 360-degree image 40 may be spherical content having a 360-degree omnidirectional view point, but there may be a missing area 43 in all areas of transverse and longitudinal directions except for an FOV 41 which is a range (e.g., a player view angle) which is actually exposed on a video area viewed by a user. A focus on an area of the longitudinal direction may be a bigger problem than an area of the transverse direction in a content consumption environment.

If a 360-degree image is consumed in a mobile environment, a tilt of a mobile terminal may be sensed using a sensor (e.g., an accelerometer, a magnetic sensor, or the like) included in the mobile terminal. An image portion of a viewing angle corresponding to the tilt of the mobile terminal among 360-degree omnidirectional view points of the 360-degree image may be played back.

Figure 5:
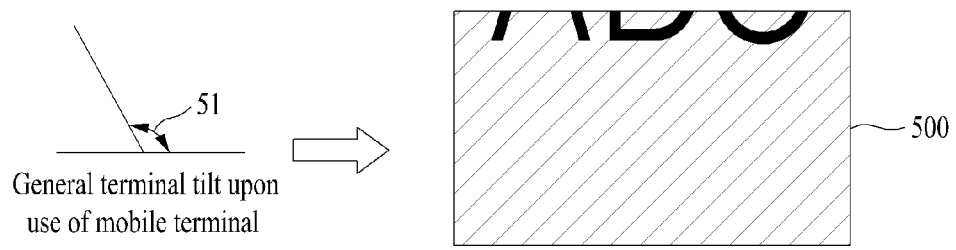
FIGS. 5, 6, and 7 are drawings illustrating an FOV of a 360-degree image depending on a tilt of a mobile terminal.
Figure 6:
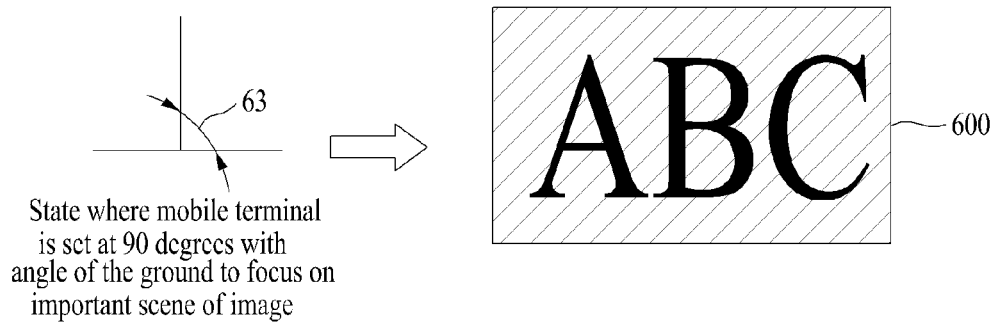

FIGS. 5 and 6 are examples of an initial content loading screen and are drawings illustrating an FOV of a 360-degree image depending on a tilt of a mobile terminal.

FIG. 5 illustrates a general terminal tilt 51 and an FOV 500 depending on the tilt 51 upon use of the mobile terminal. Since a horizontal angle of an image capture camera at a time when a 360-degree image is produced differs in tilt from a basic angle of a player upon viewing using a mobile terminal, there may be a problem of missing a specific important scene upon loading of initial content without efficiently exposing a scene intended by a content producer or a photographer on an initial screen.

Since a tilt value of a mobile terminal of a general user is not corrected in a mobile playback environment, the user must adjust a tilt of the mobile terminal to focus directly on an important scene of a 360-degree image. As shown in FIG. 6, if a tilt 63 of the mobile terminal is adjusted to form an angle of 90 degrees with the ground, an FOV 600 corresponding to the tilt 63 may be exposed on a screen of the mobile terminal.

Figure 7:
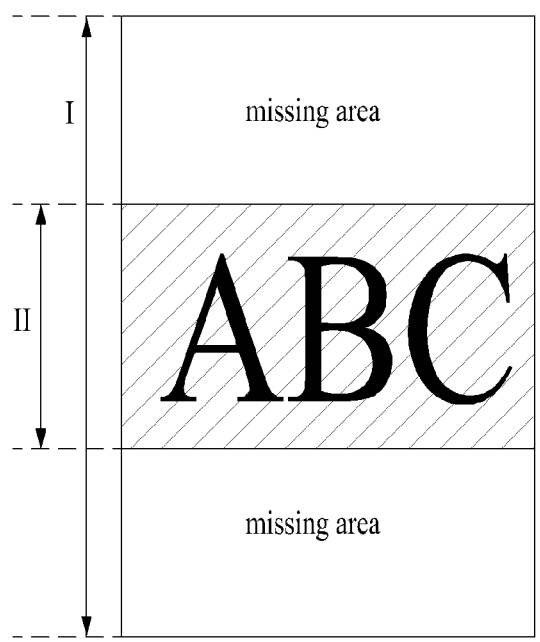

In other words, since the 360-degree image is a panorama image having an omnidirectional viewing angle, only a partial area may be exposed on a screen depending on a viewing angle of a playback view point. As shown in FIG. 7, since only a partial area II is exposed depending on a tilt of a mobile terminal in the entire vertical area I of the same playback view point in a mobile playback environment, a difference of information exposed on a screen of the mobile terminal may occur according to the FOV II.

When an important scene intended by a content producer or a photographer is the portion II where the information 'ABC' is exposed, if a tilt of a mobile terminal does not correspond to the area II, the user may miss the important scene.

If a tilt for focusing on an important scene of a 360-degree image is not a general terminal tilt of a mobile terminal, because the user views the 360-degree image at an uncomfortable angle or position, the user will be inconvenienced or burdened.

An image portion of a viewing angle corresponding to a gesture input of the user may be played back based on the gesture input (e.g., a drag input or the like) which occurs on a 360-degree image as well as a tilt of a mobile terminal in a mobile playback environment. A difference in information exposed on a screen of the mobile terminal may occur according to an FOV corresponding to a gesture input by the user as well as the tilt of the mobile terminal.

Therefore, embodiments may provide a function of correcting a focus of content playback due to a difference in a tilt or gesture input in a mobile playback environment. The inventive concept may provide an environment of focusing on a 360-degree image and consuming the focused 360-degree image by correcting a tilt value of a mobile terminal and a sensing value associated with a gesture input of the mobile terminal upon loading of content in a mobile playback environment.

Figure 8:
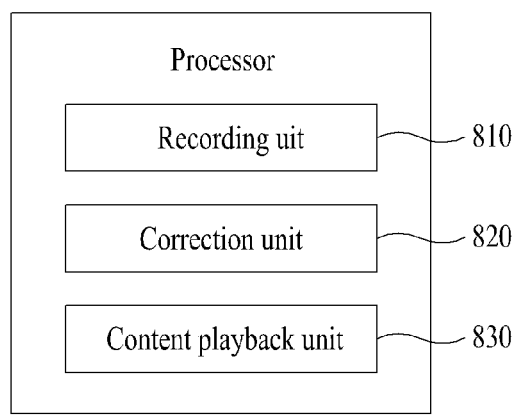
FIG. 8 is a block diagram illustrating an example of elements which may be included in a processor of a mobile terminal according to an embodiment of the present disclosure.
Figure 9:
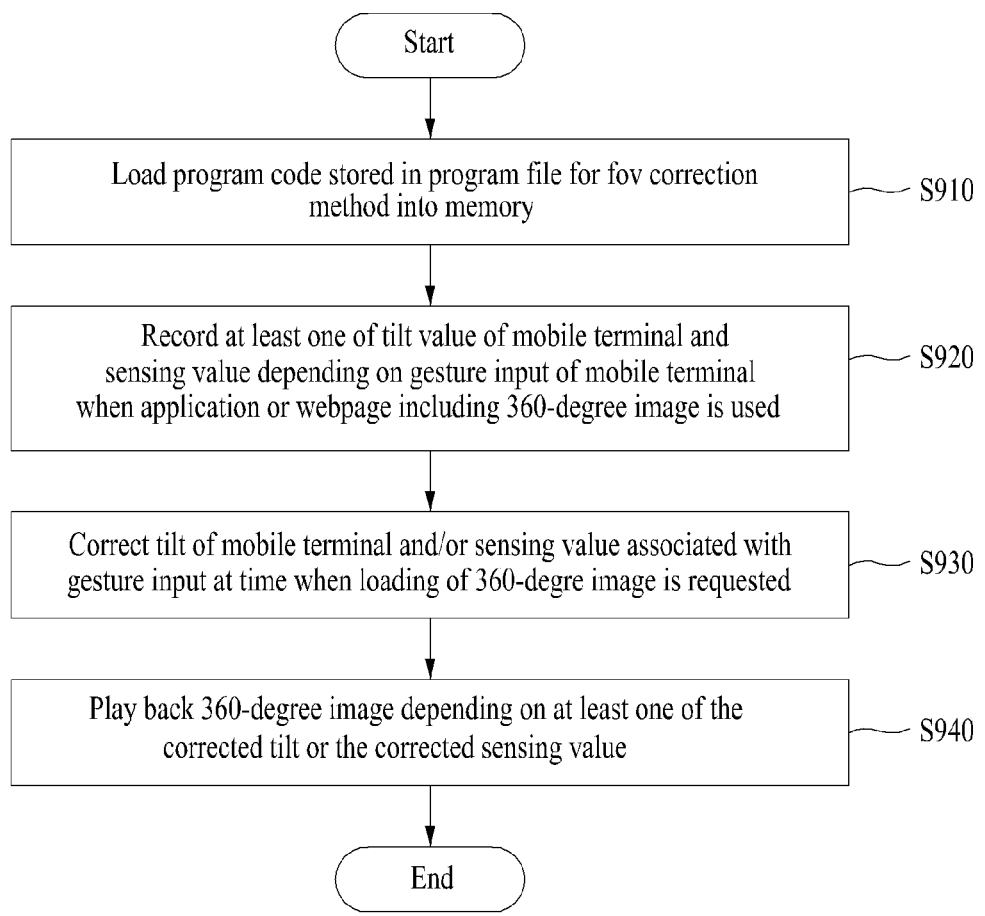
FIG. 9 is a flowchart illustrating an FOV correction method which may be performed by a mobile terminal according to an embodiment of the present disclosure.

FIG. 8 is a block diagram illustrating an example of elements which may be included in a processor of a mobile terminal according to an embodiment. FIG. 9 is a flowchart illustrating an FOV correction method which may be performed by a mobile terminal according to an embodiment.

As shown in FIG. 8, the mobile terminal may correspond to an electronic device 110 described with reference to FIGS. 1 and 2. A processor 212 of the mobile terminal may include a recording unit 810, a correction unit 820, and a content playback unit 830 as elements. Such elements of the processor 212 may be expressions of different functions performed by the processor 212 based on a control command provided by at least one program code. For example, the recording unit 810 may be used as a functional expression that the processor 212 operates to record a tilt value of the mobile terminal and/or a sensing value of a gesture input of the mobile terminal.

The processor 212 and the elements of the processor 212 may perform operations S910 to S940 included in the FOV correction method of FIG. 9. For example, the processor 212 and the elements of the processor 212 may be implemented to execute an instruction according to a code of an operating system (OS) included in a memory 211 of FIG. 2 and the at least one program code. Herein, the at least one program code may correspond to a code of a program implemented to process the FOV correction method.

The FOV correction method may fail to be performed in a shown order. Some of the operations of the FOV correction method may be omitted from the FOV correction method, or an additional operation may be further included in the FOV correction method.

In operation S910, the processor 212 may load a program code stored in a program file for the FOV correction method into the memory 211. For example, the program file for the FOV correction method may be store in a permanent storage device. The processor 212 may control the mobile terminal to load the program code into the memory 211 from the program file stored in the permanent storage device via a bus.

In this case, the processor 212 and each of the recording unit 810, the correction unit 820, and the content playback unit 830 included in the processor 212 may be different functional expressions of the processor 212 for executing an instruction of a corresponding portion in the program code loaded into the memory 211 and executing subsequent operations S920 to S940. To execute operations S920 to S940, the processor 212 and the elements of the processor 212 may directly process an arithmetic operation or may control the mobile terminal.

In operation S920, the recording unit 810 may record at least one of a tilt value of the mobile terminal and a sensing value depending on a gesture input of the mobile terminal when an application or a webpage including a 360-degree image is used. In general, the mobile terminal may provide 3-axis tilt information using a sensor included in the mobile terminal, for example, an accelerometer or a magnetic sensor, and may provide a sensing value depending on a gesture input using a touch sensor and a motion sensor. For example, the recording unit 810 may recognize whether there is a 360-degree image on a timeline of an application or on a webpage in a process of loading the mobile application or the webpage. If there is a 360-degree image on the timeline of a mobile application or on a webpage, the recording unit 810 may record a tilt value detected by the mobile terminal and/or a sensing value of a gesture input detected by the mobile terminal while the content is used. There may be various methods of recognizing a 360-degree image in the mobile terminal. For example, a content provider may mark whether to include a 360-degree image using a tag or metadata, and the mobile terminal may recognize the 360-degree image through the mark. For another example, if a 360-degree image is included, the content provider may provide a JavaScript or an application programming interface (API) for requesting a tilt value and/or a sensing value of a gesture input to the mobile terminal. Further, it is possible to provide an average tilt value of the user or other users and/or an average sensing value for gesture inputs on a script. For another example, a mobile browser or an application may verify an information tag or metadata in a document object model (DOM) parsing process or may call an associated JavaScript API, and thus, the mobile terminal may recognize a 360-degree image. For another example, the mobile terminal may provide a sensor API for recognizing a 360-degree image itself. Thus, the recording unit 810 may recognize an environment in which a 360-degree image is used through various methods and may record a tilt value detected by the mobile terminal and/or a sensing value depending on a gesture input detected by the mobile terminal while the 360-degree is used.

In operation S930, the correction unit 820 may correct at least one of a tilt of the mobile terminal and a sensing value associated with a gesture input of the mobile terminal at a time when loading of a new 360-degree image is requested. In this case, the correction unit 820 may average previously recorded tilt values and may correct a reference tilt of the mobile terminal for the content relative to the averaged tilt value. The correction unit 820 may correct a horizontal value (a basic angle value) for a 360-degree image relative to tilt information of the mobile terminal which is being used by a user at a current time. If tilt values of the mobile terminal are not sufficiently collected or if there is no tilt value of the mobile terminal at a content loading time, the correction unit 820 may use a terminal tilt value stored in a cache of an application or in a cookie or cache on a mobile browser. For another example, the correction unit 820 may use a terminal tilt average value of the user, stored in a server 150 of FIG. 2 which provides a 360-degree image. In other words, the correction unit 820 may average tilt values of the mobile terminal depending on user characteristics before a 360-degree image is played back and may correct a reference tilt of the mobile terminal using the averaged tilt value. The correction unit 820 may record a sensing value depending on a gesture input previously generated in the mobile terminal and may average the recorded sensing values, thus correcting sensing sensitivity of a gesture input of the mobile terminal for the content relative to the averaged sensing value. In other words, the correction unit 820 may correct a gesture input, such as a drag input of the user, which is one of elements for determining an FOV of a 360-degree image, before the 360-degree image is played back.

In operation S940, the content playback unit 830 may play back content depending on at least the corrected tilt or the corrected sensing value of the mobile terminal for the 360-degree image requested to be loaded. The correction unit 820 may correct a basic tilt for the 360-degree and/or a sensing value associated with a gesture input using an average tilt frequently used by the user when the 360-degree image is initially loaded. In this case, the content playback unit 830 may determine and expose an initial FOV of the 360-degree image based on the corrected tilt and/or the corrected sensing value of the gesture input. Therefore, the inventive concept may minimize inconvenience for the user to use a 360-degree image by correcting a tilt value and/or a gesture input of a mobile terminal for the 360-degree image relative to a tilt and/or a gesture input of the mobile terminal usually and frequently used by the user when the 360-degree is loaded and playing back the content depending on the corrected tilt and/or sensing value associated with the gesture input.

If the user directly operates the mobile terminal using a tilt or a gesture, such as a drag, of the mobile terminal and moves an FOV of a 360-degree image to view a desired scene, it may be difficult to move to an initial value (a basic FOV) in view of a content producer or a photographer. Therefore, the inventive concept may provide an automatic playback function for automatically returning to an initial value of a 360-degree image which is being currently played back.

The content playback unit 830 may perform automatic playback to a basic FOV by moving and exposing a current FOV to the basic FOV of a 360-degree image when the automatic playback function is executed for the 360-degree image which is being played back according to at least the corrected tilt or the corrected sensing value of the gesture input. For example, the content playback unit 830 may move a current FOV of a 360-degree image to a basic FOV corresponding to initial viewing angle information previously set in the 360-degree image and may perform automatic playback. For another example, the content playback unit 830 may extract a center area of a view point based on pixel information (or 3-axis information) or meta information of a 360-degree image as a basic FOV and may move a current FOV of the 360-degree image to the extracted basic FOV, thus performing automatic playback. If the automatic playback function is executed, the content playback unit 830 may initialize tilt information of the mobile terminal or a sensing value associated with a gesture input of the mobile terminal and may synchronize terminal information to screen playback changed due to automatic playback.

Thus, while a 360-degree image is consumed at a view point the user wants based on a tilt or gesture input of the mobile terminal, an FOV area of the 360-degree image may easily and conveniently return to an initial value always in view of a content producer or a photographer through the automatic playback function.

FIG. 10 is a flowchart illustrating an example of a method which may be performed by a server according to an embodiment.

In operation S1010, a server 150 of FIG. 2 may receive a separate protocol or message (e.g., a hypertext transfer protocol (HTTP) or the like) for requesting a streaming service for a 360-degree image from an electronic device 110 of FIG. 2. In this case, at least one of a tilt value of the electronic device 110 or a sensing value of a gesture input of the electronic device 110 may be included on the service request protocol or message. The service request protocol or message may include application information and the like for requesting a streaming service.

In operation S1020, the server 150 may verify the application information included in the service request protocol or message. If an HTTP request is received in a mobile environment, the server 150 may analyze request information received from the mobile terminal and may determine a content consumption environment.

If an environment in which the 360-degree image will be consumed is an environment using the mobile terminal, in operation S1030, the server 150 may connect application configuration information to support the correction of at least one of a tilt of the mobile terminal and a sensing value associated with a gesture input of the mobile terminal. The server 150 may set initial viewing angle information of content through a preprocessing procedure of the 360-degree image or may set initial viewing information by inserting a sensing value of an application. If there is no input of a separate sensing value, the server 150 may set a center area using an initial viewing angle based on pixel information in a vertical area of content. Thus, if loading of a 360-degree image is requested in a mobile environment, the server 150 may connect information, for correcting at least one of a reference tilt of a mobile terminal and a sensing value associated with a gesture input of the mobile terminal, to content.

In operation S1040, the server 150 may transmit a response corresponding to the service request protocol or message to the electronic device 110. In other words, if loading of a 360-degree image is requested in a mobile environment, the server 150 may respond to setting information, to support the correction of at least one of a tilt of the mobile terminal and a sensing value associated with a gesture input of the mobile terminal, together with the content.

Therefore, when providing a streaming service for a 360-degree image to the mobile terminal, the server 150 may provide an environment for correcting a basic tilt value and/or a sensing value associated with a gesture input of the mobile terminal, for determining an initial FOV of the 360-degree image.

As such, embodiments may increase content consumption and may enhance user satisfaction by correcting an FOV of content using tilt information and/or a gesture input of a mobile terminal when a 360-degree image is played back and focusing on and consuming the content in a mobile environment. Particularly, embodiments may prevent the user from missing an important scene and may effectively save the purpose of production included in content by correcting a tilt value of the mobile terminal and/or a sensing value associated with a gesture input of the mobile terminal upon loading of initial content in a mobile playback environment and exposing a scene intended by a content producer or a photographer on an initial screen.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

Embodiments may increase content consumption and may enhance user satisfaction by correcting an FOV of content using tilt information and/or a gesture input of a mobile terminal when a 360-degree image is played back and by focusing on and consuming the content in a mobile environment.

Embodiments may prevent the user from missing an important scene and may effectively save the purpose of production included in content by correcting a tilt value and/or a gesture input of a mobile terminal upon loading of initial content in a mobile playback environment and exposing a scene intended by a content producer or a photographer on an initial screen.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A field of view (FOV) correction method performed in a mobile terminal implemented with a computer, the method comprising:
    requesting to load a 360-degree image;
    correcting a basic tilt of the mobile terminal to a corrected tilt, and using the corrected tilt to determine an FOV of the 360-degree image; and
    playing the 360-degree image by exposing the FOV, wherein the FOV is different than an FOV that would be exposed using the basic tilt;
    wherein said correcting corrects a horizontal value of the FOV; and
    wherein the FOV determined using the corrected tilt includes an important scene.

2. The method of claim 1, wherein the basic tilt is calculated by averaging tilt values of the mobile terminal.

3. The method of claim 1, wherein the tilt values that are averaged are recorded in a cache on an application loaded into the mobile terminal or in a cookie or cache on a browser.

4. The method of claim 1, wherein the basic tilt is an average tilt value of the mobile terminal that is stored on a service which provides the 360-degree image.

5. The method of claim 1, wherein the corrected tilt forms an angle of approximately 90 degrees with the ground.

6. The method of claim 1, wherein the mobile terminal comprises a smartphone comprising one or more sensors, the method further comprising measuring the the basic tilt using said one or more sensors.

7. The method of claim 1, wherein the corrected tilt is based on one or more attributes of the 360-degree image.

8. The method of claim 1, wherein the corrected tilt forms an angle of approximately 90 degrees with the ground.

9. An FOV correction method performed in a server implemented with a computer, the method comprising:
    receiving a protocol or a message for requesting a streaming service for a 360-degree image from a user terminal;
    analyzing application information included in the protocol or the message for requesting the streaming service, and determining a content consumption environment of the user terminal, said determining comprising determining whether the content consumption environment is a smartphone environment;
    if the content consumption environment is a smartphone environment, connecting configuration information, to support correction for a tilt of a mobile terminal;
    transmitting the 360-degree image connected to the configuration information to the mobile terminal, the 360-degree image being transmitted as a response to the protocol or the message for requesting the streaming service;
    wherein the mobile terminal plays the 360-degree image based on the correction of the tilt, wherein the FOV played by the mobile terminal is different than an FOV that would have been played without the correction for the tilt, and wherein the FOV played by the mobile terminal includes a scene of the 360-degree image designated as important.

10. The method of claim 9, wherein the tilt is corrected to form an angle of approximately 90 degrees with the ground.

11. The method of claim 9, wherein the configuration information is connected if and only if the content consumption environment is a smartphone environment.

12. The method of claim 9, wherein an initial FOV of the 360-degree image connected to the configuration information is different than if the 360-degree image were not connected to the configuration information.

13. A computer program stored in a non-transitory computer-readable medium to execute an FOV correction method performed in a mobile terminal implemented with a computer, the method comprising:
    requesting to load a 360-degree image;
    correcting for a tilt of the mobile terminal, for determining an FOV of the 360-degree image; and
    playing the 360-degree image by exposing the FOV depending on at least said correcting, wherein the FOV is different than an FOV that would be exposed without said correcting, and wherein the FOV includes a scene of the 360-degree image designated as important.

14. A mobile terminal implemented with a computer, the mobile terminal comprising:
    at least one processor configured to execute a computer-readable instruction, wherein the at least one processor is configured to:
    request to load a 360-degree image;
    correct for a tilt of the mobile terminal, for determining an FOV of the 360-degree image; and
    play the 360-degree image by exposing the FOV depending on at least said correcting, wherein the FOV is different than an FOV that would be exposed without said correcting, and wherein the FOV includes a scene of the 360-degree image designated as important.

15. A server implemented with a computer, the server comprising:
    at least one processor configured to execute a computer-readable instruction, wherein the at least one processor is configured to:
    receive a protocol or a message for requesting a streaming service for a 360-degree image from a user terminal;
    analyze application information included in the protocol or the message for requesting the streaming service, and determine a content consumption environment of the user terminal, including at least determining whether the content consumption environment is a smartphone environment;
    if the content consumption environment is a smartphone environment, connect configuration information, to support the correction for a tilt of a mobile terminal such that an initial FOV of the 360-degree image is different than an FOV that would be played without the correction for the tilt and such that the initial FOV includes a scene of the 360-degree image designated as important; and
    transmit the 360-degree image connected to the configuration information to the mobile terminal, the 360-degree image being transmitted as a response to the protocol or the message for requesting the streaming service.

16. The server of claim 15, wherein the process is configured to connect said configuration information if and only if the content consumption environment is a smartphone environment.

* * * * *